United States Patent [19]
Hata et al.

[11] Patent Number: 5,382,990
[45] Date of Patent: Jan. 17, 1995

[54] PROJECTOR OF A REAR PROJECTION TYPE

[75] Inventors: Mitsuo Hata; Shigeo Matsumoto, both of Kanagawa, Japan

[73] Assignee: Sony Corporation, Tokyo, Japan

[21] Appl. No.: 2,733

[22] Filed: Jan. 11, 1993

[30] Foreign Application Priority Data

Jan. 10, 1992 [JP] Japan .................. 4-020648

[51] Int. Cl.⁶ .................. G03B 21/56; G03B 21/10
[52] U.S. Cl. .................. 353/94; 359/460
[58] Field of Search .............. 353/94, 30, 38; 358/60, 358/231; 359/449, 456, 460; 348/744, 786, 840

[56] References Cited

U.S. PATENT DOCUMENTS

| | | | |
|---|---|---|---|
| 3,909,525 | 9/1975 | Fagan | 353/30 |
| 4,129,365 | 12/1978 | Aversano et al. | 353/94 |
| 5,011,277 | 4/1991 | Ogino et al. | 353/94 |
| 5,085,495 | 2/1992 | Iwahara et al. | 353/94 |
| 5,185,677 | 2/1993 | Honda et al. | 359/460 |
| 5,206,760 | 4/1993 | Nakashima et al. | 359/443 |
| 5,249,005 | 9/1993 | Furuno | 353/94 |

Primary Examiner—Thomas B. Will
Assistant Examiner—William C. Dowling
Attorney, Agent, or Firm—Jay H. Maioli

[57] ABSTRACT

A number of units of projectors of a rear projection type are assembled together, and one screen commonly used for the assembled screen units is attached to front portions of the screen units. Assemblies, each having the above construction, are assembled in longitudinal and lateral directions to form a picture, so that a margin in the middle of the screen can be eliminated or the number of margins can be significantly reduced.

3 Claims, 2 Drawing Sheets

PROJECTOR OF A REAR PROJECTION TYPE

BACKGROUND OF THE INVENTION

1. Field of the Invention

The present invention relates to a rear projector, i.e., a rear projection type video monitor or receiver.

2. Description of the Related Art

Projectors of a rear projection type are often used in crowded places, places of events and others for the purposes such as advertisement or presentation. In view of transportation and mass production for such usage, multiple projectors of standardized sizes, e.g., of 40 inches are prepared and transported to a place for projection, at which they are assembled together to form a large screen assembly for projecting a picture on the screen assembly to be viewed by many persons.

However, since the multiple projectors are assembled to form a large picture, margins, i.e., screen holders, each of which is located around the screen of each projector and has a width of, e.g., 5 mm, form many margins of 10 mm in width. These margins extend longitudinally and laterally in the picture, and thus impair integral nature of the large picture.

Accordingly, it is an object of the invention to provide a projector of a rear projection type, which can eliminate or suppress margins when it is combined with another projector.

SUMMARY OF THE INVENTION

The invention provides a projector of a rear projection type including a plurality of projector units combined together, and a screen used in common with the plurality of projector units and located in front of the same.

According to the invention, a projector apparatus of a rear projection type may include multiple projectors of a rear projection type combined together to form a picture, each projector including a plurality of projector units combined together, and a screen commonly used for the plurality of projector units and located in front of the same.

According to the invention, since the common screen is provided in the plurality of projector units assembled together, a inside margin is not formed in these projector units.

Therefore, the number of margins can be reduced in such case that multiple projectors, each of which include the plurality of projector units and the common screen, are assembled together to form the big picture.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
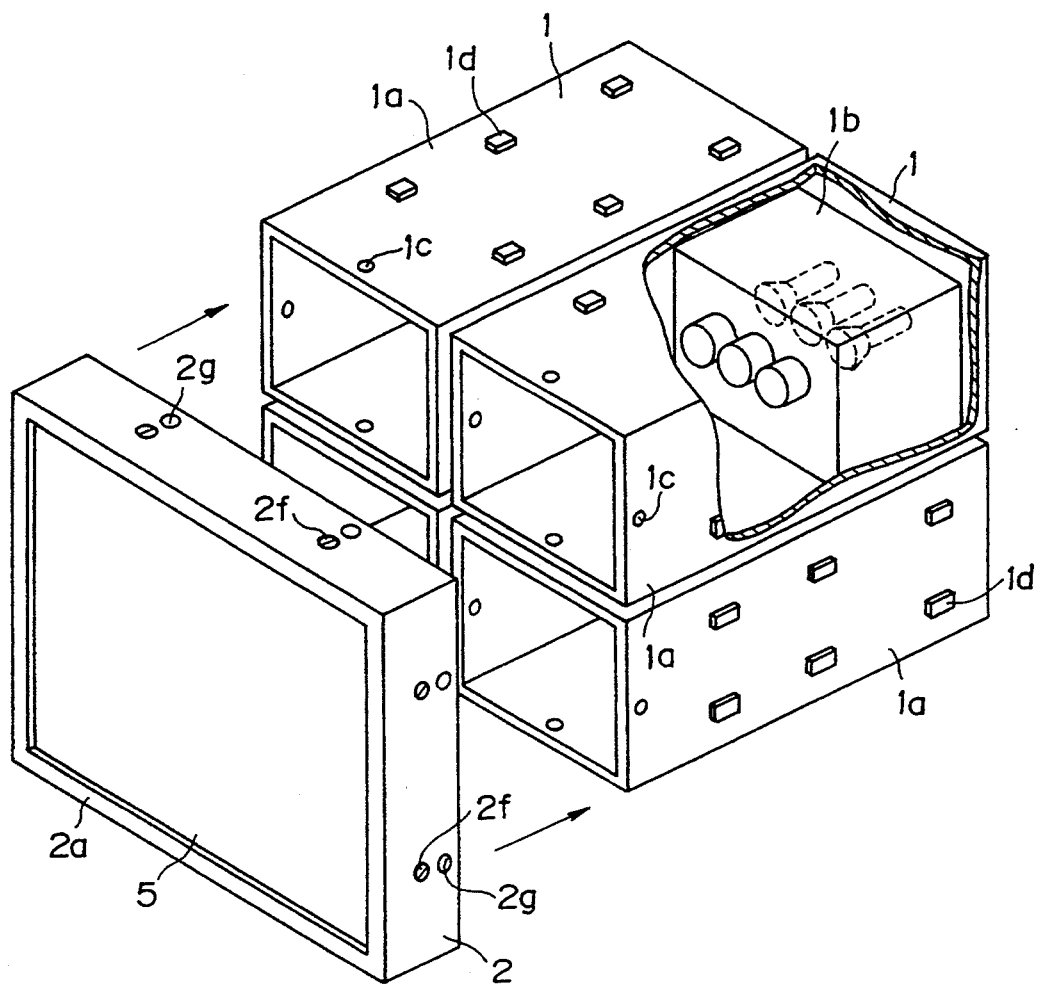
FIG. 1 is a perspective view showing four projector units and one screen to be attached thereto with a certain part cut away.
Figure 2:
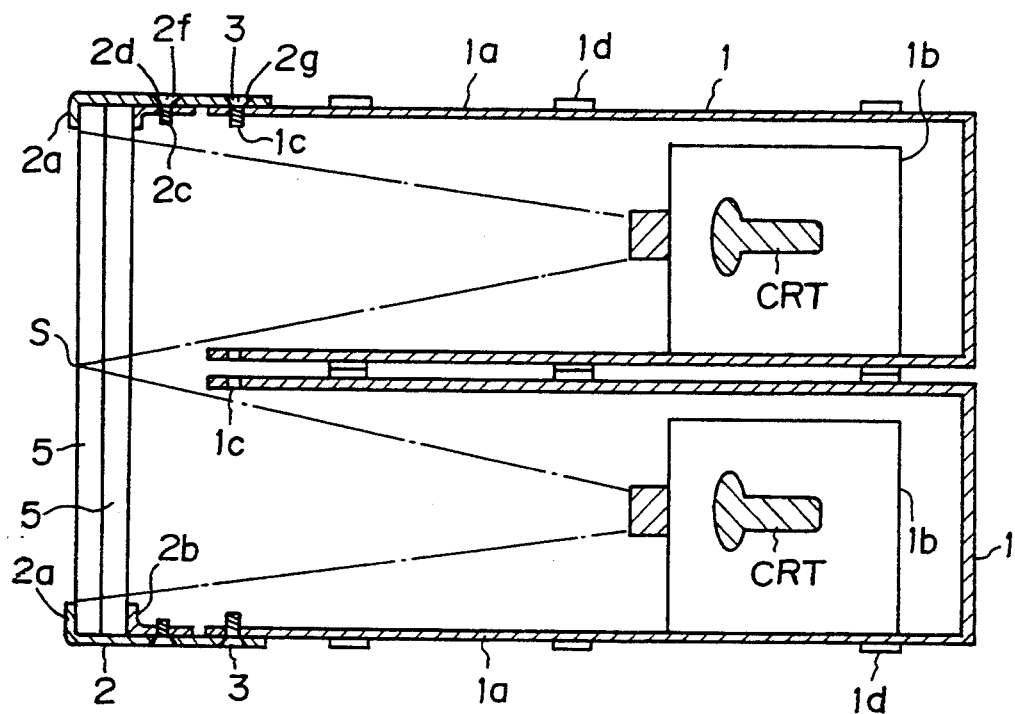
FIG. 2 is a cross section showing four projector units and one screen attached thereto shown in FIG. 1.

Referring to FIGS. 1 and 2, an embodiment of the invention includes four projector units of projectors of the rear projection type of 40 inches, which are assembled together in two by two, and a screen of 80 inches by 80 inches attached thereto.

Each projector unit 1 includes a casing 1a of a rectangular parallelepiped form having an open front surface, and a projector body 1b attached to a rear portion thereof for projecting three primary colors. Each projector unit 1 is provided with attaching means (not shown) for fixing the same to the adjacent projector units 1 so as to be assembled together. The casing 1a is provided at its front portion with screw holes 1c for fixing a screen holder. The illustrated projector unit can also be used for an independent projector of a rear projection type formed of one projector unit and a screen attached thereto. Therefore, the screw holes 1c are formed at the opposite side surfaces as well as upper and lower surfaces for enabling use independently. Each projector unit 1 is provided at its four outer surfaces with legs or feet 1d, so that multiple projector units provided with the independent screens may be assembled together in horizontal positions.

A screen holder 2 has a square shape and dimensions which are determined to allow fitting thereof onto the outer surfaces of front portions of the four projector units. The screen holder 2 has a front portion 2a which is bent inwardly to form a screen support. There is also prepared an independent square metal support 2b (FIG. 2), which is sized to be fitted into the screen holder 2. The support 2b is provided with several screw holes 2c. The screen holder 2 is provided with through-holes 2d coaxial to the screw holes 2c. Screws 2f are engaged into the screw holes 2c through the holes 2d, whereby the support 2b is fixed to the screen holder 2. The screen holder 2 is further provided with through-holes 2g, which are located coaxial to the screw holes 1c at the outer surface of the casing 1c when the holder 2 is assembled to the projector units. Screws 3 are engaged into the screw holes 1c through the holes 2g, whereby the screen holder 2 is fixed to the projector units assembled together.

A screen 5 is sized to cover the whole front surfaces of the four projector units. The screen 5 is formed of two sheets, which are overlapped with each other and are fitted into the screen holder 2. After the fitting, the support 2b is fixed to the screen holder 2 by the screws 2f as described above, whereby the screen 5 is fixed to the screen holder The projector of the rear projection type thus constructed is transported to a place for projection, during which the screen and screen holder are separated from the projector units.

At the place for projection, the four projector units 1 are assembled and fixed together in 2 by 2 in the longitudinal and lateral directions.

The screen holder 2, to which the screen 5 is fixed by the support 2b, is fitted onto the outer surfaces of the front portions of the projector units 1 and is fixed thereto by the screws 3.

Thereby, the assembly is completed. In the operation of the projector of the rear projection type, three CRTs of the projector body 1b in each projector unit 1 project beams onto the screen to form a picture. In the screen 5 of 80 inches, there is not margin, which may be caused by a joint, so that integral nature of the picture and thus quality thereof is improved, and the quality of the picture. Further, as shown in FIG. 2, the screen holder does not exist between the adjacent projector units, and thus the beams are not interrupted by the screen holder, so that an edge S of the beam from each projector body 1b can be accurately coincided with the edge S from the adjacent projector body 1b. Therefore, lack of picture is prevented, and thus the quality of the picture is further improved.

Figure 3:
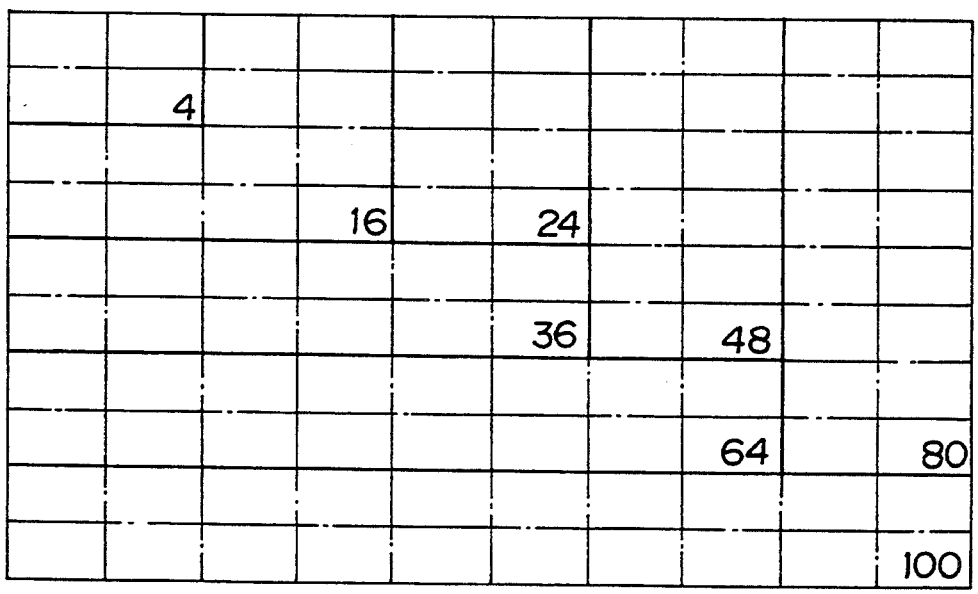
FIG. 3 is a schematic view showing various sizes of one screen.

In the embodiment described above, the four projector units 1 disposed in two by two are provided with the one screen. However, the sizes of the screen are not restricted thereto. As shown in FIG. 3, the screen may have various sizes, for example, corresponding to 16 units arranged in 4 by 4 or 24 units arranged in 4 by 6 in the longitudinal and lateral directions, respectively.

In the embodiment described above, the units of the projector units assembled together are 40 inches. However, they may be of different value, e.g., of 35 inches or 50 inches.

In the embodiment described above, the whole picture is formed on the one screen. However, multiple projectors of the rear projection type, each including a plurality of projector units and one screen attached to the front surfaces thereof, may be assembled to form the picture. For example, four projectors, each of which corresponds to the projector in the illustrated embodiment and includes the four projector units in 2×2 and one screen attached to the front surfaces thereof, may be assembled in 2×2 to form a picture of 160 inches. In this case, there are formed only two margins, i.e., one longitudinal margin and one lateral margin, of which number is significantly reduced, compared with six margins, i.e., three longitudinal margins and three lateral margins formed by conventional 16 projectors which are assembled in 4×4 and each including independent screens. Therefore, the multiple projectors described above can significantly improve the quality of the picture.

According to the projector of the rear projection type, as described hereinabove, the margin can be eliminated or the number thereof can be significantly reduced, and thus the quality of the picture can be significantly improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projector of a rear projection type comprising:
   a plurality of projector units attached together to form a rectangular projection area;
   a screen assembly commonly used for said plurality of projector units attached together and having substantially the same size as said rectangular projection area, said screen assembly including two sheets overlapped one with another and being fitted into a screen holder in the form of a frame having a front portion bent inwardly to form a support for supporting said two overlapped sheets and having a metal support element attached to a rear portion of said screen holder holding said two overlapped sheets against said support; and
   means for attaching said screen holder of said screen assembly to said plurality of projector units attached together in front of said rectangular projection area.

2. A projector apparatus of a rear projection type comprising:
   multiple projectors of a rear projection type combined together to form a picture, each of said projectors including:
   a plurality of projector units attached together to form a rectangular projection area;
   a screen assembly commonly used for said plurality of projector units attached together and located in front of the same, said screen assembly including two overlapped sheets being fitted into a screen holder in the form of a frame for holding said two overlapped sheets in front of said rectangular projection area, said screen holder including a front portion bent inwardly to form a support for supporting said two overlapped sheets and a metal inner frame element for holding said screen against said support; and
   fastener means for attaching said screen holder assembly to said plurality of projector units attached together.

3. The projector of claim 2, wherein each of said plurality of projector units includes a respective plurality of leg elements and further wherein said plurality of projector units are attached together so that respective leg elements are in abutting arrangement.

* * * * *